United States Patent
Ellis et al.

(10) Patent No.: US 11,556,748 B2
(45) Date of Patent: Jan. 17, 2023

(54) METHODS AND APPARATUS TO IMPROVE ACCURACY OF EDGE AND/OR A FOG-BASED CLASSIFICATION

(71) Applicant: Intel Corporation, Santa Clara, CA (US)

(72) Inventors: Keith Ellis, Carlow (IE); Giovani Estrada, Dublin (IE); Michael Nolan, Maynooth (IE); Niall Cahill, Galway (IE); David Coates, Leixlip (IE)

(73) Assignee: Intel Corporation, Santa Clara, CA (US)

( * ) Notice: Subject to any disclaimer, the term of this patent is extended or adjusted under 35 U.S.C. 154(b) by 1147 days.

(21) Appl. No.: 16/147,043

(22) Filed: Sep. 28, 2018

(65) Prior Publication Data
US 2019/0102659 A1    Apr. 4, 2019

(51) Int. Cl.
G06K 9/62 (2022.01)
G06N 5/02 (2006.01)
G06K 9/00 (2022.01)
G06N 20/20 (2019.01)

(52) U.S. Cl.
CPC ............. *G06K 9/6282* (2013.01); *G06K 9/00* (2013.01); *G06K 9/627* (2013.01); *G06K 9/6273* (2013.01); *G06K 9/6276* (2013.01); *G06K 9/6284* (2013.01); *G06N 5/022* (2013.01); *G06N 20/20* (2019.01)

(58) Field of Classification Search
CPC ........ G06K 9/6282; G06K 9/00; G06K 9/627; G06K 9/6273; G06K 9/6276; G06K 9/6284; G06N 5/022; G06N 20/20
See application file for complete search history.

(56) References Cited

U.S. PATENT DOCUMENTS

| 5,801,970 A | * | 9/1998 | Rowland | ............... G01S 3/7865 342/63 |
| 2011/0078099 A1 | * | 3/2011 | Weston | ................... G16B 40/20 706/12 |

* cited by examiner

*Primary Examiner* — Zhitong Chen
(74) *Attorney, Agent, or Firm* — Hanley, Flight & Zimmerman, LLC

(57) ABSTRACT

Methods, apparatus, systems and articles of manufacture to improve accuracy of a fog/edge-based classifier system are disclosed. An example apparatus includes a transducer to mounted on a tracked object, the transducer to generate data samples corresponding to the tracked object; a discriminator to: generate a first classification using a first model based on a first calculated feature of the first data samples from the transducer, the first model corresponding to calculated features determined from second data samples, the second data samples obtained prior to the first data samples; generate an offset based on a difference between a first model feature the first model and a second model feature of a second model, the second model being different than the first model; and adjust the first calculated feature using the offset to generate an adjusted feature; a pattern matching engine to generate a second classification using vectors corresponding to the second model based on the adjusted feature; and a counter to, when the first classification matches the second classification, increment a count.

30 Claims, 10 Drawing Sheets

|        | Fea_1 | Fea_2 | Fea_3 | Fea_4 | Fea_5 |
|--------|-------|-------|-------|-------|-------|
|        | 255   | 255   | 255   | 255   | 255   |
| 1_mean | 109   | 132   | 94    | 25    | 107   |
|        | 106   | 130   | 80    | 17    | 105   |
|        | 105   | 128   | 79    | 16    | 104   |
| 2_mean | 73    | 109   | 56    | 15    | 70    |
|        | 27    | 97    | 26    | 14    | 23    |
|        | 26    | 96    | 25    | 13    | 22    |
|        | 15    | 92    | 14    | 11    | 16    |
| 3_mean | 0     | 0     | 0     | 0     | 0     |

FIG. 3A

|   | Fea_1 | Fea_2 | Fea_3 | Fea_4 | Fea_5 |
|---|---|---|---|---|---|
| 1 | 40 | 198 | 67 | 29 | 76 |
| 2 | 106 | 131 | 80 | 16 | 107 |
| 3 | 80 | 115 | 70 | 17 | 100 |
| 4 | 182 | 126 | 135 | 60 | 143 |
| 5 | 109 | 130 | 92 | 21 | 134 |
| 6 | 105 | 165 | 88 | 19 | 113 |
| 7 | 196 | 200 | 109 | 49 | 150 |
| 8 | 60 | 121 | 51 | 15 | 49 |
| 9 | 111 | 117 | 81 | 16 | 125 |
| 10 | 73 | 109 | 56 | 15 | 70 |
| 11 | 128 | 121 | 102 | 18 | 121 |
| 12 | 34 | 86 | 18 | 11 | 18 |
| 13 | 83 | 97 | 61 | 17 | 85 |
| 14 | 59 | 109 | 43 | 14 | 56 |
| 15 | 94 | 126 | 65 | 16 | 98 |
| 16 | 37 | 96 | 35 | 18 | 30 |
| 17 | 82 | 118 | 57 | 15 | 89 |
| 18 | 1 | 89 | 5 | 10 | 1 |
| 19 | 8 | 91 | 10 | 11 | 5 |
| 20 | 30 | 92 | 19 | 15 | 12 |
| 21 | 18 | 93 | 18 | 15 | 16 |
| 22 | 17 | 94 | 15 | 10 | 17 |
| 23 | 8 | 90 | 7 | 11 | 4 |
| 24 | 19 | 95 | 20 | 10 | 25 |
| 25 | 11 | 85 | 12 | 10 | 7 |
| 26 | 16 | 93 | 16 | 11 | 14 |
| 27 | 24 | 96 | 23 | 14 | 27 |
| 28 | 16 | 93 | 18 | 11 | 14 |
| 29 | 11 | 92 | 10 | 6 | 12 |
| 30 | 13 | 94 | 14 | 10 | 13 |
| 31 | 4 | 89 | 4 | 11 | 3 |
| 32 | 0 | 89 | 0 | 7 | 1 |
| 33 | 35 | 108 | 32 | 10 | 33 |
| 34 | 32 | 91 | 24 | 10 | 18 |
| 35 | 5 | 92 | 4 | 11 | 2 |
| 36 | 17 | 91 | 18 | 10 | 20 |
| 37 | 32 | 100 | 35 | 10 | 18 |
| 38 | 70 | 96 | 49 | 14 | 70 |
| 39 | 83 | 97 | 61 | 17 | 85 |
| 40 | 59 | 109 | 43 | 14 | 56 |
| 41 | 94 | 126 | 65 | 16 | 98 |
| 42 | 37 | 96 | 35 | 18 | 30 |
| 43 | 82 | 118 | 57 | 15 | 89 |
| 44 | 69 | 111 | 46 | 14 | 71 |
| 45 | 127 | 99 | 135 | 27 | 109 |
| 46 | 139 | 98 | 123 | 27 | 157 |
| 47 | 182 | 126 | 135 | 60 | 143 |
| 48 | 109 | 130 | 92 | 21 | 134 |
| 49 | 105 | 165 | 88 | 19 | 113 |
| 50 | 196 | 200 | 109 | 49 | 150 |
| 51 | 88 | 114 | 107 | 15 | 67 |
| 52 | 133 | 131 | 114 | 29 | 116 |
| 53 | 130 | 158 | 126 | 27 | 125 |
| 54 | 69 | 102 | 72 | 17 | 52 |
| 55 | 147 | 132 | 110 | 30 | 136 |
| 56 | 183 | 100 | 110 | 36 | 172 |
| 57 | 163 | 171 | 122 | 32 | 154 |

| F1 | F2 | F3 | F4 | F5 | Class. |
|---|---|---|---|---|---|
| 2 | 1 | 2 | 1 | 2 | 2 |
| 1 | 2 | 1 | 2 | 1 | 1 |
| 2 | 2 | 2 | 1 | 2 | 2 |
| 1 | 2 | 1 | 1 | 1 | 1 |
| 1 | 2 | 1 | 1 | 1 | 1 |
| 2 | 1 | 1 | 1 | 1 | 1 |
| 1 | 1 | 1 | 1 | 1 | 1 |
| 2 | 2 | 2 | 2 | 2 | 2 |
| 1 | 2 | 1 | 2 | 1 | 1 |
| 2 | 2 | 2 | 2 | 2 | 2 |
| 1 | 2 | 1 | 1 | 1 | 1 |
| 3 | 3 | 3 | 3 | 3 | 3 |
| 2 | 2 | 2 | 1 | 2 | 2 |
| 2 | 2 | 2 | 2 | 2 | 2 |
| 2 | 2 | 2 | 2 | 2 | 2 |
| 2 | 3 | 2 | 3 | 2 | 2 |
| 2 | 2 | 2 | 2 | 2 | 2 |
| 3 | 3 | 3 | 3 | 3 | 3 |
| 3 | 3 | 3 | 3 | 3 | 3 |
| 2 | 3 | 3 | 2 | 3 | 3 |
| 3 | 3 | 3 | 2 | 3 | 3 |
| 3 | 3 | 3 | 3 | 3 | 3 |
| 3 | 3 | 3 | 3 | 3 | 3 |
| 3 | 3 | 3 | 3 | 2 | 3 |
| 3 | 3 | 3 | 3 | 3 | 3 |
| 3 | 3 | 3 | 3 | 3 | 3 |
| 3 | 3 | 3 | 2 | 2 | 3 |
| 3 | 3 | 3 | 3 | 3 | 3 |
| 3 | 3 | 3 | 3 | 3 | 3 |
| 3 | 3 | 3 | 3 | 3 | 3 |
| 3 | 3 | 3 | 3 | 3 | 3 |
| 3 | 3 | 3 | 3 | 3 | 3 |
| 2 | 2 | 2 | 3 | 2 | 2 |
| 2 | 3 | 3 | 3 | 3 | 3 |
| 3 | 3 | 3 | 3 | 3 | 3 |
| 3 | 3 | 3 | 3 | 3 | 3 |
| 2 | 2 | 2 | 3 | 3 | 2 |
| 2 | 3 | 2 | 2 | 2 | 2 |
| 2 | 2 | 2 | 1 | 2 | 2 |
| 2 | 2 | 2 | 2 | 2 | 2 |
| 2 | 2 | 2 | 2 | 2 | 2 |
| 2 | 3 | 2 | 3 | 2 | 2 |
| 2 | 2 | 2 | 2 | 2 | 2 |
| 2 | 2 | 2 | 2 | 2 | 2 |
| 1 | 2 | 1 | 1 | 1 | 1 |
| 1 | 2 | 1 | 1 | 1 | 1 |
| 1 | 2 | 1 | 1 | 1 | 1 |
| 1 | 2 | 1 | 1 | 1 | 1 |
| 2 | 1 | 1 | 1 | 1 | 1 |
| 1 | 1 | 1 | 1 | 1 | 1 |
| 2 | 2 | 1 | 2 | 2 | 2 |
| 1 | 2 | 1 | 1 | 1 | 1 |
| 1 | 1 | 1 | 1 | 1 | 1 |
| 2 | 2 | 2 | 1 | 2 | 2 |
| 1 | 1 | 1 | 1 | 1 | 1 |
| 1 | 2 | 1 | 1 | 1 | 1 |
| 1 | 1 | 1 | 1 | 1 | 1 |

METHODS AND APPARATUS TO IMPROVE ACCURACY OF EDGE AND/OR A FOG-BASED CLASSIFICATION

FIELD OF THE DISCLOSURE

This disclosure relates generally to processors, and, more particularly, to methods and apparatus to improve accuracy of edge and/or fog-based classification.

BACKGROUND

In recent years, remote monitoring to track objects has increased in popularity. For example, wearable devices or other devices may include sensor(s), processor(s), transmitter(s), etc. to gather data related to objects (e.g., humans, drones, animals, robotics, products, etc.) and transmit information to a remote server (e.g., a cloud-based server) for remote monitoring of the object(s). It is desirable to have such wearable devices and/or any processing devices to operate for long durations of time (e.g., weeks, months, years) without needing to be recharged. However, transmitting lots of information from a remote device to a server requires a lot of power, thereby decreasing the battery life of the remote device and hence viability for certain use cases. Accordingly, such a remote device may include a processor to front-load some of the processing/decision making locally, meaning less information needs to transmitted, and thus saving energy as transmission is more energy intensive than processing.

BRIEF DESCRIPTION OF THE DRAWINGS

FIGS. 3A and 3B illustrates a model and example vectors to be classified by an example sensor of FIG. 1 classified by the auto-feature discriminator of FIG. 2.

FIG. 4 illustrates a moving average for different classifications reflecting locally calculated vectors to classify relative to auto-feature discriminator thresholds generated by the auto-feature discriminator of FIG. 2.

The figures are not to scale. In general, the same reference numbers will be used throughout the drawing(s) and accompanying written description to refer to the same or like parts.

DETAILED DESCRIPTION

Figure 1:
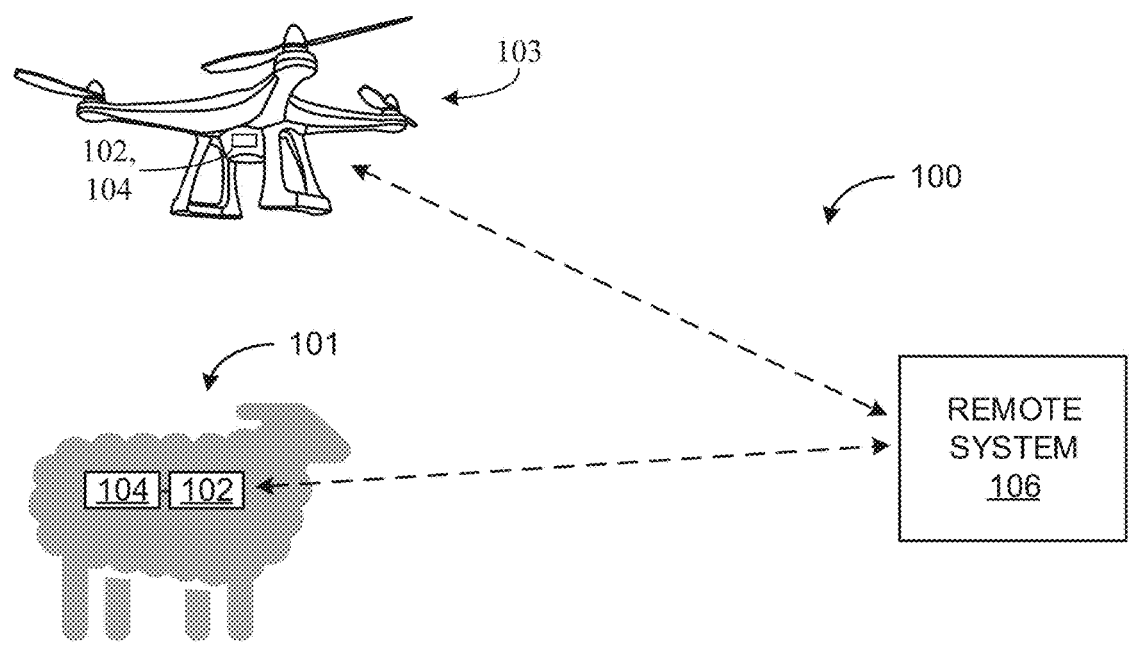
FIG. 1 is an example environment in which an example edge/fog-based data classifier system may be used.

Monitoring systems (e.g., remote or cloud-based monitoring systems) may be implemented using one or more processors to monitor (e.g., track) remotely located and/or mobile objects. To track the remotely located objects, sensor may be deployed in or at (e.g., attached to) the remotely located objects to provide sensed data to the monitoring systems. However, transmitting large amounts of data from a sensor consumes a large amount of power (e.g., relative to processing transmission, 8-10× the power of transmission), thereby shortening the duration of operation of the sensor of device including the sensor before a battery recharge is required. Accordingly, as disclosed herein, some remote monitoring systems deploy small processors (e.g., microcontrollers, FPGA, etc.) to perform minor computations to the sensed data. In this manner, the processors may be programmed to perform some of the computations at the device, as opposed to performing all computations at a remote monitoring system (e.g., corresponding to edge/fog-based processing) and only send predetermined data to the remote monitoring system for further processing and/or to alert a user. The amount of power required to perform such minor computations is less than the power required to send raw data to the remote monitoring system, the amount of time that a remote device including edge/fog-based processing can operate before requiring a recharge is substantially longer than a device that gathers and transmits all data from the sensor.

Some example monitoring systems may be interested in particular monitoring events. For example, a monitoring system may be interested in when a particular object changes moving patterns (e.g., from standing to walking, from walking to running, from running to laying, etc.). In such systems, the remotely deployed devices may include one or more pattern matching engine(s) (PME) to perform distance-based classifications based on a model. For example, a model may be generated that corresponds to the acceleration of an object (e.g., a feature) and a classification (e.g., sitting, running, standing, walking, etc.). Equipped with the model, an edge/fog-based processor may gather data samples from a sensor to calculate an acceleration of an object and the PME may compare the calculated acceleration to the model to classify the object carrying the sensor as sitting, running standing, walking, etc. In this manner, the edge/fog-based processor can transmit an alert to the monitoring system when the moving pattern changes, as opposed to transmitting all the sensed data to the monitoring system for processing. Accordingly, the edge/fog-based processor consumes less power than device that only gathers and transmits sensor data to a monitoring system.

As described above, edge/fog-based classifications are based on models. In some examples, a user and/or processor may generate a model based on a large sample size of known data using data science techniques. Accordingly, such edge/fog-based classifications may pool raw data from numerous sensors over a long period of time corresponding to a global representations of the objects being tracked. Although global representations may provide a good starting point for classifications, the characteristics of the objects being tracked may not be highly correlated with the global data. Accordingly, edge/fog-based classifications using global models may correspond to inaccurate results for some groups of tracked objects. For example, when tracking movement of animals, external factors (e.g., temperature, weather, altitude, humidity, etc.) may affect how the animals move. Accordingly, a global model might not be a good representation to classify goats in very low temperature environments, for example.

Examples disclosed herein increase the accuracy of edge/fog-based classifications by performing classifications using a pattern matching engine (e.g., corresponding to a global model) and an auto-feature discriminator (AFD) that performs a classification based on statistics of local data (e.g., data received from the sensor(s) in communication with the edge/fog-based classification processor). Using examples disclosed herein, the accuracy of remote classification of livestock health monitoring is increased by 21%. Additionally examples disclosed herein do not require reference to offline data analysis or off-device technologies (e.g., global positioning system (GPS)). Additionally, examples disclosed herein reduce the training time and effort required to develop new models when a global model has been proven to be inaccurate with regard to tracked objects. Additionally, examples disclosed here are more robust and versatile through effective use of a locally devised knowledge base and/or a globally devised knowledge base.

The AFD generates an AFD-based model that corresponds to local data gathered by local sensor(s). In some examples, the AFD generates the AFD-based model by adjusting the thresholds that mirror the global PME-based model after a bedding-in period by changing the mean and associated bands (e.g., thresholds) for the classifications for the features. For example, when local data from a sensor is obtained, the edge/fog-based processor generates a vector corresponding to the predefined features. The AFD gathers the all generated vectors corresponding to local data (e.g., data obtained by sensors locally at or near the device) sorted by PME-based classification and performs a moving average for the generated vectors for the classifications. The moving averages are used to generate an AFD-based model corresponding (i.e. calibrated) to local data. In this manner, a combination of the PME-based classification model and the AFD-based classification model may be used to increase the accuracy of edge/fog-based classifications by accounting for both global data and local data.

FIG. 1 is an example environment 100 including an example edge/fog-based data classifier system 102. In FIG. 1, the example edge/fog-based data classifier system 102 classifies data related to an example animal 101 and/or an example drone 105. The example edge/fog-based data classifier system 102 receives sensed data from example sensor(s) 104 and transmits classification data, alerts, and/or other information to an example remote system 106.

The example animal 101 and/or drone 103 of FIG. 1 is an example of an object that is monitored by the example edge/fog-based data classifier system 102. Alternatively, the example animal 101 and/or drone 103 may be any type of object. In some examples, the animal 101 may be classified as walking, laying, or standing. Additionally, the animal 101 may be classified as lame (e.g., unable to walk normally because of an injury or illness affecting the leg or foot). Accordingly, the example edge/fog-based data classifier system 102 may gather data (e.g., raw samples) from the example sensor(s) 104 and load a first model into the PME that classifies the animal 101 as walking, laying, or standing based on the raw samples from the sensor 104. If the edge/fog-based data classifier system 102 determines that (e.g., classifies) the animal 101 is walking, the edge/fog-based data classifier system 102 may load a second classification model which determines if the animal 101 is lame. Although FIG. 1 is described in conjunction with a two tiered classification of the example animal 101, the example edge/fog-based data classifier system 102 may be described in conjunction with any number of tiers with any number of classifications for any type of object (e.g., robotics, humans, environmental sensing, drones, etc.).

The example edge/fog-based data classifier system 102 of FIG. 1 is an integrated circuit, printed circuit board, and/or device that includes hardware, software, and/or firmware to process and classify data samples from the example sensor(s) 104. Instead of transmitting the raw data/samples from the sensor(s) 104 directly to the remote system 106, which requires a large amount of power, the example edge/fog-based data classifier system 102 performs classifications locally, thereby limiting the amount data that needs to be transmitted to the example remote system 106. In this manner, the amount of time that the example edge/fog-based data classifier system 102 can operate before requiring a recharge is longer.

The example edge/fog-based data classifier system 102 of FIG. 1 includes an interface to receive inputs corresponding to how to process and classify raw samples from the example sensor(s) 104. For example, the inputs correspond to one or more classification models to be used for the classifications. The model(s) correspond to one or more features. The features may include a rate of change of acceleration magnitude, a mean of acceleration magnitude, and/or any other type of feature that may be calculated from raw samples of the sensor(s) 104. The features correspond to a classification category (e.g., walking, standing, laying, etc.). The classification categories of the features corresponds to a threshold range of values. The features correspond to the object(s) to be monitored. For example, a model of a plasma etch sub-system may correspond to features corresponding to infrared intensity. In such an example, the classifier system 102 may classify when the plasma has not ashed the silicon wafer based on a vector corresponding to the infrared intensities. In another example, a model may correspond to a feature of mean of acceleration with three classification categories. In such an example, the primary category may correspond to mean of acceleration values between 80 and 255, the second category may correspond to a mean of acceleration values between 26 and 79, and the third category may correspond to a mean of acceleration values between 0 and 25. The threshold(s) may be based on a global model derived offline through various data science techniques. The example edge/fog-based classifier system 102 calculates value(s) corresponding to the feature(s) from received data samples. Once the calculated features are generated, the edge/fog-based data classifier system 102 compares the calculated features to the classification category threshold ranges to determine a classification of the data samples using a PME.

As described above, the global model may not correlate well to the actual local environment 100. Accordingly, classifying data related to the environment 100 based solely on a global model (e.g., using a PME) may have unacceptable accuracy. To improve the accuracy classifications at the edge/fog-based data classifier system 102, the fog/edge-based data classifier system 102 performs an auto-feature discrimination function to generate a local-based classification using the same or a sub-set of features to that of the PME. The fog/edge-based data classifier system 102 generates local classifications based on the mean and an associated band (e.g., a threshold range of values) for the categories. In some examples, the AFD can adjust this local mean and band via a moving average mechanism. In this manner, the fog/edge-based data classifier system 102 classifies raw samples from the sensor 104 using both the global PME-based classification and the local AFD-based classification. If the classifications are the same, the fog/edge-based data classifier system 102 performs a corresponding action (e.g., implement a counter, transmit the classification to the remote system 106, implement a subsequent model for a subsequent classification for a different classification tier, etc.). If the classification are different, the fog/edge-based data classifier system 102 applies offsets for the features to the vector to classify which is subsequently re-classified by the PME. In this manner, the global PME-based classification is adjusted based on the local data due to an adjustment to the vector to be classified by the PME. The fog/edge-based data classifier system 102 compares a second comparison of the subsequent PME-based classification with the AFD-based classification. If the subsequent PME-based classification with the AFD-based classification are the same, the fog/edge-based data classifier system 102 performs a corresponding action. If the subsequent PME-based classification with the AFD-based classification are not the same, the fog/edge-based data classifier system 102 discards the classification and increments a counter to track the unsuccessful classification comparison. An example implementation of the fog/edge-based data classifier system 102 is further described below in conjunction with FIG. 2.

The example sensor(s) 104 of FIG. 1 is a transducer to gather (e.g., detect) physical information (e.g., acceleration, speed, temperature, light, infrared intensity, sound, position, etc.) from an object and/or an environment and a processor included in or coupled to the sensor(s) 104 converts the detected information into an electrical signal representative of data to be processed by the example fog/edge-based data classifier system 102. For example, if the sensor 104 is an inertial sensor (e.g., a combination of an accelerometer and a gyroscope), the sensor may detect the inertia of the example animal 101 at a point(s) in time. The processor then converts the detected inertia into an electrical signal (e.g., a voltage, a current, and/or a digital signal) representative of the inertia, thereby corresponding to an inertia-based data sample. If the sensor 104 is operating at a preset frequency, the sensor will measure the inertia of the animal 101 every X duration of time (e.g., seconds, milliseconds, etc.) and convert the measurements into a data sample (e.g., a voltage, a current, and/or a digital signal), thereby corresponding to a plurality of data samples. The sensor(s) 104 transmit the generated data samples to the example edge/fog-based data classifier system 102 after a measurement is taken and the measurement is converted into the data sample (e.g., a signal) representative of the measurement. The example sensor(s) 104 may be included in, or otherwise connected to the example fog/edge-based data classifier system 102. The example sensor(s) 104 may be, for example, inertia sensors, GPS sensors, light sensors, audio sensors, infrared sensors, gyroscopes, accelerometer, and/or any other type of sensor.

The example remote system 106 of FIG. 1 communicates with the example fog/edge-based data classifier system 102 via wired or wireless communication. For example, the fog/edge-based data classifier system 102 may periodically, aperiodically, and/or based on a trigger, transmit alerts, counts, classifications, and/or other information. In this manner, the remote system 106 can provide useful information to a user regarding the objects being tracked (e.g., the example animal 101, the example drone 103, etc.). In some examples, the remote system 106 is a cloud-based data tracker. In some examples, the remote system 106 is a device (e.g., a processor) in the cloud. In some examples, the remote system 106 may be part of and/or in communication with a processor, mobile phone, tablet, and/or any other computing device. In some examples, the remote system 106 provides model(s) and/or other instructions to the example fog/edge-based data classifier system 102 for classification purposes. For example, the remote system 106 may provide features to be calculated for the classification tiers, feature threshold(s) for the classification(s) of the classification tiers, different models for different classification tiers, instructions corresponding to how many classification tiers to use and when to switch from one classification tier to another, when to discard data, when to transmit alerts, classifications, and/or other information to the remote system 106, etc.

Figure 2:
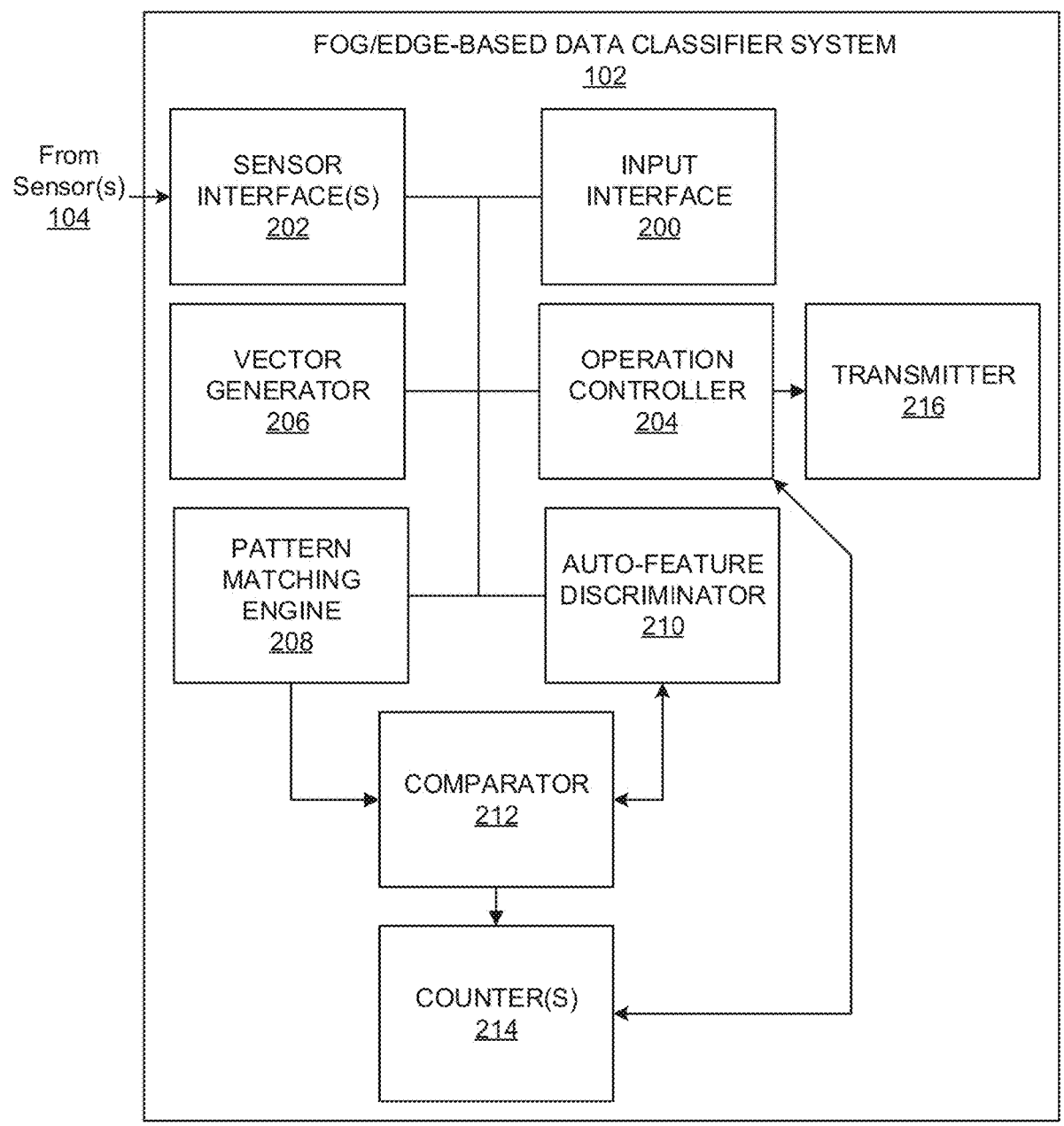
FIG. 2 is a block diagram of the example edge/fog-based data classifier system of FIG. 1.

FIG. 2 is a block diagram of an example implementation of the fog/edge-based data classifier system 102 of FIG. 1. The example fog/edge-based data classifier system 102 of FIG. 2 includes an example input interface 200, an example sensor interface(s) 202, an example operation controller 204, an example vector generator 206, an example pattern matching engine 208, an example auto-feature discriminator 210, an example comparator 212, example counter(s) 214, and an example transmitter 216.

The example input interface 200 of FIG. 2 receives configuration and/or other instructions corresponding to classification models (e.g., corresponding to model features and the feature thresholds for classification categories, and corresponding data) and instructions corresponding to how many classification tiers to perform, when to switch classification tiers, when to transmit data, classifications, alerts, etc., from the example remote system 106. The received models may correspond to a model generated by offline calculations based on data science techniques corresponding to a global population. The input interface 200 may receive the information from the remote system 106 and/or another computing device via a wired or wireless connection.

The example sensor interface(s) 202 of FIG. 2 receives raw data samples from the one or more sensors 104 of FIG. 1. The number of samples that the sensor interface(s) 202 obtains is a preset value but is configurable. For example, the sensor interface(s) 202 may gather samples for X duration of time while a processor(s) coupled to the sensor(s) 102 transmit data samples (e.g., based on detections of the sensor(s) 102) at a frequency of Y, thereby corresponding to Z samples (e.g., $X*Y=Z$). In some examples, the Z data samples are stored into a local memory (e.g., the example local memory 913 of FIG. 9) and/or a buffer while the edge/fog-based data classifier system 102 processes the data samples. For example, the local memory may store Z number of the most recently received data samples from the processor that generated the samples based on detections of the sensor(s) 104 (e.g., when the local memory stores the Z data samples and a new data sample is received, the local memory removes the oldest data sample and stores the newest data sample). In this manner, when the example edge/fog-based data classifier system 102 is to perform a classification, the edge/fog-based data classifier system 102 removes the data samples from the local memory, which ensures that the classification is using the most recently generated data samples. In some examples, the sensor interface(s) 202 transmit the Z samples to the vector generator 206 to generate a vector corresponding to features of the Z samples, as further described below. In some examples, the vector generator 206 may access the Z samples from the local memory/buffer to generate the vector, as further described below. In some examples, the sensor interface 202 is a single interface to receive data samples from one or more sensors 104. In some examples, the sensor interface(s) 202 includes multiple interfaces to receive data samples from multiple sensors 104.

The example operation controller 204 of FIG. 2 controls the operation of the example fog/edge-based data classifier system 102 based on the instructions received from the input interface 200. For example, the operation controller 204 determines which classification models to use and when, based on the received instructions. The example operation controller 204 loads classification models at the appropriate time, based on the hierarchy of classification tiers identified in the instructions. For example, initially, the operation controller 204 may load a first classification model with first classification category thresholds for first features into the pattern matching engine 208 to classify whether the animal 101 is walking, laying, or standing In such an example, the operation controller 204 may, in response to classifying the animal 101 as walking, load a second classification model with second classification category thresholds for second features into the pattern matching engine 208 to classify whether the animal 101 is lame. Additionally, the operation controller 204 may instruct how the vector generator 206 is to generate a vector to be classified based on the model features of the classification model(s) based on the received instructions. For example, if the model includes a model feature corresponding to a mean of acceleration magnitude, the operation controller 204 instructs the vector generator 206 to calculate the mean of acceleration magnitude of raw samples received by the sensor interface(s) 202 and uses the calculated mean of acceleration magnitude as a calculated feature (e.g., which is included as an element in the vector to be classified).

Additionally, the example controller 204 of FIG. 2 may determine when to perform additional operations based on certain classifications. For example, if the example operation controller 204 is facilitating a two tier classification to determine lameness of the example animal 101, the first tier classification determines whether the animal 101 is standing, laying, or walking. If the first tier classification results in a walking classification (e.g., from both the pattern matching engine 208 and the auto-feature discriminator 210 during a first or subsequent classification, as further described below), then the example operation controller 204 loads a second model into the pattern matching engine 208 and the auto-feature discriminator 210 to perform a second classification to determine if the animal 101 is lame. In such an example, if the second classification results in a lame classification (e.g., from both the pattern matching engine 208 and the auto-feature discriminator 210), the operation controller 204 may instruct the transmitter 216 to transmit an alert to the example remote system 106 identifying that the animal 101 is lame. Alternatively, the operation controller 204 may transmit alerts and/or any other data based on any user and/or manufacturer preferences.

The example vector generator 206 of FIG. 2 converts data samples from the sensor(s) 104 via the sensor interface(s) 202 into a vector to be classified based on the instructions of the operation controller 204. In some examples, the vector generator 206 may access the data samples from a local memory/buffer. For example, if the operation controller 204 instructs the vector generator 206 to calculate three features of the data samples to generate a 3 element vector to be classified, the vector generator 206 calculates the three features from the raw data samples and generates a three element vector based on the results. In some examples, the vector generator 206 normalizes the vectors to correspond to the ability of the pattern matching engine 208 and/or the auto-feature discriminator 210. For example, if the pattern matching engine and/or the auto-feature discriminator 210 is only capable of classifying data corresponding to values from 0-255, the vector generator 206 may normalize the generated vector so that the values of the vector are within the 0-255 value window. Once the vector generator 206 generates the vector to be classified, the vector generator 206 provides the vector to be classified to the pattern matching engine 208 and the auto-feature discriminator 210 for classification.

The example pattern matching engine 208 of FIG. 2 is a parallel data recognition engine. In some examples, the example pattern matching engine 208 is a neuromorphic hardware-implemented engine that loads a model (e.g., a set of vectors) and compares a vector of calculated features to the model, thus returning a classification for the data samples corresponding to the matched or nearest matched model vector. For example, the pattern matching engine 208 is an array of Y number of rows (e.g., 128) with up to X number of features (e.g., 128). The model corresponds to a set of vectors (e.g., up to X vectors, for example) (rows), whereby the vectors can have up to X number of features. For example, the model includes X number of vectors corresponding to known classifications from global samples. In this manner, when the example pattern matching engine 208 receives a vector to be classified, the pattern matching engine 208 compares the vector to be classified to the model of X number of vectors corresponding to the known classifications. The pattern matching engine 208 may utilize a distance-based classifier, such as k-nearest neighbors algorithm (KNN) or a radial basis function (RBF) to identify a vector of the X number of vectors that matches, or most closely matches, the vector to be classified and returns a classification based on the identified vector.

The example auto-feature discriminator 210 of FIG. 2 operates as a dynamic pattern matching engine that is able to adjust the vectors classified by the pattern matching engine 208 based on data being received from the sensor(s) 104. In this manner, the auto-feature discriminator 210 classifies based on local data and may adjust the inputs to the PME 208 based on the local data. For the vectors to be classified that the auto-feature discriminator 210 receives from the vector generator 206, the auto-feature discriminator 210 adjusts the moving average and the associated thresholds or bands for the classification categories. Initially, the auto-feature discriminator 210 acts as a slave (e.g., while the pattern matching engine 208 acts as a master). For example, initially, the auto-feature discriminator 210 classifies vectors to be classified using a model (thresholds) based on the vectors of the PME-based model. For example, the auto-feature discriminator 210 may generate a model based on the mean and/or standard deviation of the vectors of the PME-based model for the classification categories. The model includes bands (e.g., threshold ranges) corresponding to the classification categories. Additionally or alternatively, the auto-feature discriminator 210 may receive the PME-based classification from the pattern matching engine 208. During the initial classifications (e.g., a bedding-in period), the auto-feature discriminator 210 classifies the vectors to be classified and uses the vectors to be classified and the corresponding PME-based classification (e.g., based on the model or the PME classification) to calculate and assign a moving average for the classifications, as further described below in conjunction with FIG. 4. After the bedding-in period (e.g., after X number of classifications for the classification categories or X number of total classifications), the auto-feature discriminator 210 generates the AFD-based means and threshold ranges (e.g., bands) for the classification categories, that constitutes a simplified AFD-based model. For example, AFD 210 may utilize a set number of standard deviations of the classification categories for the features above/below the means to make the threshold range(s). Alternatively, the example AFD 210 may generate the AFD-based model based on any manipulation of the mean(s) and/or standard deviation(s). Additionally, the auto-feature discriminator 210 continues to calculate the moving average for the classification categories for the features to continually adjust the model thresholds based on the subsequent vectors to be classified and the PME-based classifications of such vectors.

To classify using threshold bands corresponding to either the PME-based model or the AFD-based model, the example auto-feature discriminator 210 compares the elements of a vector to be classified to the threshold bands corresponding to the particular feature. For example, an example model (e.g., a model corresponding to means and/or threshold bands of the PME-based model or a AFD-based model) may correspond to a single feature (e.g., rate of change of acceleration) and the model may include values corresponding to walking (e.g., rate of change of acceleration values from 106 to 255), standing (e.g., rate of change of acceleration values from 27-105), or laying (e.g., rate of change of acceleration values from 0-26). In such an example, if the vector generator 206 generates a vector to be classified with a calculated rate of change of acceleration value of 87 (e.g., based on data samples from the sensor(s) 104), the example auto-feature discriminator 210 classifies the feature(s) corresponding to the data as standing (e.g., $27 \leq 87 \leq 105$). If rate of change of acceleration value is the only feature (e.g., the vector to be classified is a single element vector), the auto-feature discriminator 210 classifies the data samples as standing. If there are other features/elements in the vector to be classified, the example auto-feature discriminator 210 classifies the the features based on the corresponding feature thresholds. Once, all the features/elements in the vector to be classified are identified/calculated, the auto-feature discriminator 210 classifies the vector (e.g., generates an overall classification) based on the feature classification that occurred most. For example, if a vector to be classified include five elements corresponding to 5 different calculated features, the auto-feature discriminator 210 may classify the first feature as walking, the second calculated feature as walking, the third calculated feature as laying, the fourth calculated feature as walking, and the fifth calculated feature as laying. In such an example, because most (e.g., four) of the five features are classified as walking, the auto-feature discriminator 210 classifies the vector to be classified (e.g., corresponding to data samples from the sensor(s) 104) as walking.

Additionally, after the bedding in period of the auto-feature discriminator 210 of FIG. 2, the auto-feature discriminator 210 may operate as the master and the pattern matching engine 208 may act as the slave when the AFD-based classification does not match the PME-based classification. For example, as described above, after the bedding in period, the auto-feature discriminator 210 classifies vectors based on a moving average (e.g., the AFD-based model corresponding to local data) while the pattern matching engine 208 continues to classify the same vectors based on the preset centroids of the PME-based model (e.g., corresponding to global data) using a suitable distance-based classifier, such as a K-Nearest Neighbor or Radial Basis Function. Accordingly, the classifications of the pattern matching engine 208 and the auto-feature discriminator 210 may or may not be the same. If the classifications are not the same, the auto-feature discriminator 210 applies vector offsets based on a difference between the mean of the classification category using the PME-based model (e.g., the global model) to the mean of the classification category of the AFD-based model (i.e. the current moving average). For example, if the pattern matching engine 208 classifies a vector to be classified (e.g., [109, 132, 94, 19, 107]) as class 1 (e.g., walking, for example) and the auto-feature discriminator 210 classifies the same vector to be classified as class 2, the auto-featured discriminator 210 may apply the generated vector offsets for class 1 to the vector to be classified and request the PME 208 to re-classify using the adjusted vector to be classified. The classification offsets are based on a difference between (A) the average values for the features as derived from the pre-set PME model (e.g., [109, 132, 94, 25, 107]) and (B) the current moving-average values for the features in the AFD-based model (i.e. the current moving averages, [138, 139, 105, 30, 132], for example). In such an example, the auto-feature discriminator 210 determines the offsets to be [29, 7, 11, 5, 25] (e.g., [138, 139, 105, 30, 132]−[109, 132, 94, 25, 107]=[29, 7, 11, 5, 25]), which equates in this specific case to the local mean for classification 1 (walking) being elevated versus the global mean. Once the auto-feature discriminator 210 generates the offsets, the auto-feature discriminator 210 may adjust the vector to be classified by the offsets and request the adjusted vector to be re-classified by the pattern matching engine 208, [80, 124, 83, 14, 82] (e.g., [109, 132, 94, 19, 107]−[29, 7, 11, 5, 25]). If the subsequent PME-based classification still does not match the AFD-based classification, the mismatch is tracked (e.g., via the counters 214, as further described below), the classifications are discarded, and the sensor interface(s) 202 obtains subsequent data samples for a subsequent vector to be classified.

The example comparator 212 of FIG. 2 compares the PME-based classifications of the pattern matching engine 208 with the AFD-based classification of the auto-feature discriminator 210. If the comparator 212 determines that the PME-based classification and the AFD-based classification are the same, the comparator 212 outputs a first result (e.g., a logic value of '1,' for example), and, if the comparator 212 determines that the PME-based classification and the AFD-based classification are not the same, the comparator 212 outputs a second result (e.g., a logic value of '0,' for example). In this manner, the counter(s) 214 and/or the auto-feature discriminator 210 based on the output of the comparator 212. For example, if the comparator 212 determines that the PME-based classification and the AFD-based classification match during the first round of classifications, the example auto-feature discriminator 210 determines that a subsequent comparison based on offsets is not needed and the counter(s) 214 increment accordingly. If the comparator 212 determines that the PME-based classification and the AFD-based classification do not match during the first round of classifications, the example auto-feature discriminator 210 determines that a subsequent comparison based on offsets is needed and the counter(s) 214 may be incremented accordingly.

The example counter(s) 214 of FIG. 2 track a count of classification matches and classification mismatches. For example, the counter(s) 214 may include two counters, a first counter to track every classification match and a second counter to track every classification mismatch. Alternatively, the counter(s) 214 may be implemented by one counter to track both matches and mismatches. The counter tracks the matches and mismatches by incrementing a first count for matches when the comparator 212 outputs a value corresponding to a classification match and incrementing a second count for mismatches when the comparator 212 outputs a value corresponding to a classification mismatch. In some examples, there may be additional hardware to prevent the counter 214 from receiving the output of the comparator 212 when the first comparison results in a mismatch. For example, logic gates and registers may be implemented to, when the first comparison results in a mismatch, prevent the first comparator output from being used to increment the counter(s) 214. In this manner, the second comparison (e.g., based on the adjusted PME-based classification using offsets) is used to increment the counter(s) 214. The counter(s) 214 transmit the match count and/or mismatch count to the example operation controller 204. In some examples, the operation controller 204 transmits instructions and/or a control signal to reset the example counter(s) 214.

In some examples, when the counter(s) 214 transmit the match count and/or the mismatch count to the example operation controller 204, the operation controller 204 may perform a comparison of the counts. For example, the operation controller 204 may calculate a ratio of the match count to the mismatch count. The operation controller 204 may transmit an alert using the example transmitter 216 if, for example, the ratio is above/below one or more thresholds. Alternatively, the operation controller 204 may transmit the alert based solely on the match and/or mismatch counts being above/below one or more thresholds. In this manner, if the number of mismatches becomes large, a user may be alerted to a problem (e.g., a problem with the fog/edge-based data classifier system 102, the sensor(s) 104, and/or the object being tracked (e.g., the example animal 101, the example drone 103, etc.). Additionally or alternatively, if the number of matches becomes large, a user may be alerted to the accuracy of the global model.

The example transmitter 216 of FIG. 2 transmits data (e.g., via a wireless or wired connection) to the example remote system 106. The transmitter 216 transmits alerts and/or data to the example remote system 106 (e.g., AFD-based model information, offsets, etc.) based on instructions from the example operation controller 204. In some examples, the transmitter 216 transmits data wirelessly via any wireless communication medium. In some examples, the transmitter 216 transmits data via a wired connect (e.g., when a field technician connects to the fog/edge-based data classifier system 102 using a person processing device).

FIG. 3A includes an example model 300 that represents derived threshold ranges (e.g., bands) corresponding to three example classification categories 302, 304, 306 based on the vectors and corresponding classifications of the global model of the PME 208. FIG. 3B illustrates example AFD-based classification 310 including example vectors to be classified 312, example feature classifications 314, and example overall classifications 316. Although the example model 300 of FIG. 3A corresponds to three classification categories and five features with particular thresholds, the example model 300 may correspond to any number of classification categories and any number of features with any thresholds.

The example model 300 of FIG. 3A represents derived classification means and thresholds pertaining to a global model determined through data science techniques. For example, when the global vector model is loaded to the PME 208, the example AFD 210 determines the threshold ranges (e.g., bands) based on a means and/or standard deviation of the vectors in the global model for the corresponding classification category. The model 300 corresponds to the identified bands corresponding to the global model. The example model 300 includes thresholds for the classification categories 302, 304, 306 for the model features (e.g., features 1-5). The example model 300 further includes classification category means 303, 305, 307 for the classification categories 302, 304, 306 for the features. For example, if the first classification category 302 corresponds to the animal 101 of FIG. 1 walking, the second classification category 304 corresponds to the animal 101 standing, and the third classification category 305 corresponds to the animal 101 laying, the thresholds for the features correspond to real data and/or simulated data of known classifications to generate a correlation to the features and the classification categories. For example, a user may collect data from a large number of animals when the animals are laying, standing, or walking and generate statistics, such as means and standard deviations of calculated features of the data obtained while the animals are laying, standing, or walking to generate a model. In the example model 300 of FIG. 3A, it was determined, based on a testing of a population representative of a global population, that (A) the average value of a first feature (e.g., magnitude of acceleration) of the vectors in the global model is 15, when animals of the population are laying, (B) the average value of the first feature of the vectors in the global model is 73 when the animals of the population are standing, and (C) the average value of the first feature of the vectors in the global model is 109 when the animals of the population are walking. Accordingly, a user or processor generates the example model 300 corresponds to minimum and maximum thresholds for the classification categories for the features based on an average value and/or standard deviation for the features in the classification categories based on the vectors of the global model. As described above, the example auto-feature discriminator 210 may use the means and/or threshold ranges identified in the model 300 to classify vectors to be classified corresponding to data samples from a tracked object (e.g., the animal 101, the example drone 103, etc.). As further described below in conjunction with FIG. 4, the example auto-feature discriminator 210 adjusts the model 300 based on a moving average of the model 300 with vectors to be classified generated by the example vector generator 206. The adjusted model (e.g., the AFD-based model) is used by the AFD 210 to classify vectors to be classified after the bedding in period and/or to generate offsets to offset vectors to be classified by the PME 208, as further described below.

The example vectors to be classified 312 of FIG. 3B represent raw data samples that have been obtained and converted into vectors based on the calculated features of the model 300. For example, the vector generator 206 obtains a number of data samples and calculates the five features (e.g., based on the features of the model 300) from the number of data samples. In some example, the vector generator 206 normalizes the vector of calculated features prior to transmitting the vector to be classified to the pattern matching engine 208. The pattern matching engine 208 classifies the elements (e.g., calculated feature values) of the vector by comparing the vectors to vectors of the global model to output a PME-based classification. Additionally or alternatively, the AFD 210 may classify the elements of the vector by comparing the value to the threshold range(s) of the corresponding feature in the model 300. For example, using the first vector to be classified (e.g., [40, 198, 67, 29, 76]), the auto-feature discriminator 210 determines that element one classifies to the second classification category 304 (e.g., $27 \leq 40 \leq 105$), element two classifies to the first classification category 302 (e.g., $130 \leq 198 \leq 255$), element three classifies to the second classification category 304 (e.g., $26 \leq 67 \leq 79$), element four classifies to the first classification category 302 (e.g., $17 \leq 29 \leq 255$), and element five classifies to the second classification category 304 (e.g., $23 \leq 76 \leq 104$), as illustrated in the first feature classification of the example feature classifications 314. Accordingly, the example auto-feature discriminator 210 classifies the first vector to be classified as the second classification because three of five of the classifications (e.g. a majority vote classifier) corresponds to the second classification, as illustrated in the first overall classification of the example overall classifications 316.

Figure 4:
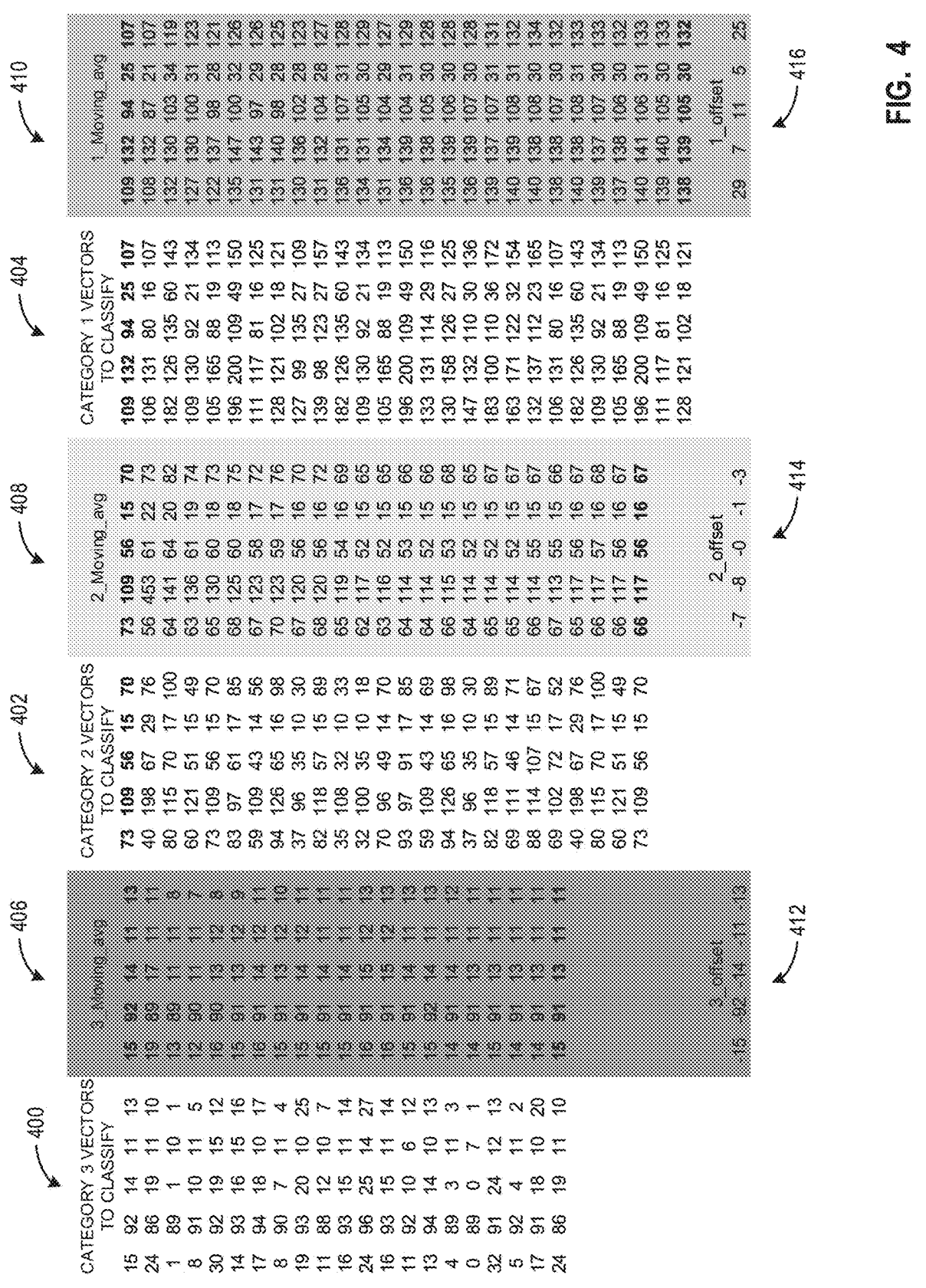

FIG. 4 illustrates an example of how the example auto-feature discriminator 210 generates offsets and the moving average to generate a dynamic model corresponding to the local data. The example moving average and offset calculation of FIG. 4 is described in conjunction with the example model 300, the example vectors to be classified 312 and the example classifications 316 of FIG. 3B. FIG. 4 includes third example vectors to be classified 400 corresponding to the third classification category 306, second example vectors to be classified 402 corresponding to the second classification category 304, and first example vectors to be classified 404 corresponding to the first classification category 302. FIG. 4 further includes third example moving averages 406 corresponding to the third classification category 306, second example moving averages 408 corresponding to the second classification category 304, first example moving averages 410 corresponding to the first classification category 302, example third classification category offsets 412, example second classification category offset 414, and example first classification category offsets 416.

As described above, the example auto-feature discriminator 210 generates a moving average to generate a dynamic model based on local data from the example sensor 104. For example, when the example pattern matching engine 208 and/or the AFD 210 classifies the first vector to be classified (e.g., [40, 198, 67, 29, 76]) as a second classification, the example auto-feature discriminator 210 computes a moving average based on the average of the second classification category 304 with the vector to be classified. For example the auto-feature discriminator 210 computes the average of [73, 109, 56, 15, 70] (e.g., the mean for the features of the second classification category of the model 300 representative of global data) and [40, 198, 67, 29, 76] (e.g., the vector that was classified as the second classification based on the PME-based model) to obtain a moving average for the second classification category of [56, 153, 61, 22, 73], which remains the moving average for the second classification category until a subsequent vector to be classified is classified using the PME-based classification as a second classification. In some examples, the PME-based averages are not included in the moving average calculation of the AFD-based model. Because the second vector to be classified in FIGS. 3A and 3B is classified as a first classification, the auto-feature discriminator 210 will calculate the moving average for the first classification with the second vector to be classified. As described above, when more than a threshold of moving averages have been calculated (e.g., total or per classification category), the auto-feature discriminator 210 generates a dynamic local-based model corresponds to the moving average for the classification categories and continues to update the model as the averages change.

When the auto-feature discriminator 210 determines that offsets need to be generated (e.g., when an initial PME-based classification and AFD-based classification of a vector to be classified do not match), the auto-feature discriminator 210 calculates an offset corresponding to the PME-based classification and a difference between the averages of the model 300 and the moving average of the corresponding classification category. For example, if the pattern matching engine 208 classifies a vector be classified as the first classification and the auto-feature discriminator 210 classifies the vector to be classified as the second classification, the auto-feature discriminator 210 calculates the offsets based on a difference between the classification category averages of the first classification of the model 300 and the current moving average for the first classification. Using the example of FIG. 4, the example auto-feature discriminator 210 calculates the example first classification category offset 416 by subtracting the current moving averages for the first classification (e.g., [138, 139, 105, 30, 132]) from the first classification averages of the example model 300 (e.g., [109, 132, 94, 25, 107]) to generate the offset vector [25, 8, 11, 5, 25] (e.g., [138, 139, 105, 30, 132]–[109, 132, 94, 25, 107]). The application of the offsets is further described below in conjunction with FIG. 5.

Figure 5:
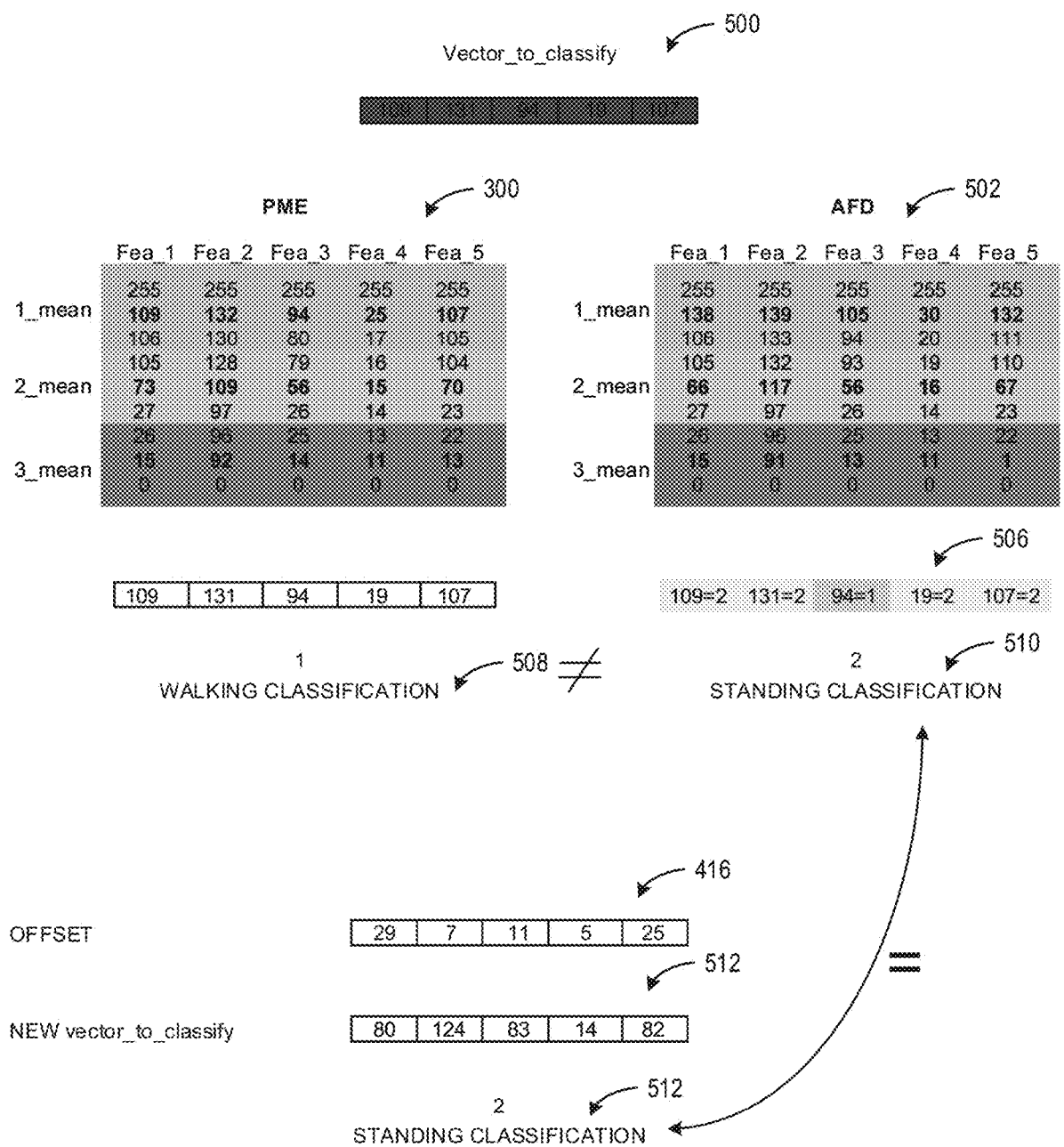
FIG. 5 illustrates an example classification resulting from the example edge/fog-based data classifier system of FIGS. 1 and/or 2.

FIG. 5 illustrates an example classification that may be performed by the example fog/edge-based data classifier system 102 after the bedding in period (e.g., when the example AFD 210 acts a master by applying the moving average-based model and applying offsets). FIG. 5 includes the example model 300 representative of the vectors of the global data of FIG. 3A and the example first classification category offsets 416 of FIG. 4. FIG. 5 further includes an example vector to be classified 500, an example AFD-based model 502, an example AFD-based features classification 506, an example PME-based overall classification 508, an example AFD-based overall classification 510, an example adjusted vector to be classified 512, and an example adjusted PME-based overall classification.

The example vector to be classified 500 of FIG. 5 corresponds to a vector that has been generated by the example vector generator 206 based on calculated features of data samples from the example sensor(s) 104 of FIG. 1. Because the fog/edge-based data classifier system 102 is operating after the bedding in period (e.g., the auto-feature discriminator 210 has received more than a threshold number of vectors to be classified to begin applying a dynamic model), the example AFD-based model 502 (e.g., a dynamic model corresponding to a moving average of local data-based features) used by the example auto-feature discriminator 210 may correspond to different means and/or threshold ranges than the model 300 representative of global data used by the example pattern matching engine 208. As described above, the dynamic model 502 corresponds to a combination of the global data model 300 and the local data corresponding to previously generated vectors to be classified.

When the vector to be classify 500 of FIG. 5 is first generated, the example PME 208 determines the PME-based overall classification 508 of the vector to be classified 500 using a PME model (e.g., vectors corresponding to classification categories) and the example AFD 210 determines the AFD-based overall classification 510 of the vector to be classified 500 using the example AFD-based model 502. For example, the PME 208 determines that because the vector matches, or is closest to, a vector of the PME model that corresponds to the first classification category, the example PME 208 generates the PME-based overall classification 508 corresponding to the first classification. Additionally, the AFD 210 determines that because most of the features of the vector to be classified 500 fall within second classification category, as illustrated in the example AFD-based featured classifications 506, the example AFD 210 generates the AFD-based overall classification 510 corresponding to the second classification. Because the PME-based overall classification 508 does not match the AFD-based classification 510, the example AFD 210 generates the offsets for the PME-based classification 508 based on difference between the feature means of the classification categories of the AFD-based model 502 and the feature means of the classification categories of the model 300 corresponding to the PME-based model. For example, because the first feature classification category means for the model 300 corresponding to global data are [109, 132, 94, 25, 107] and the first feature classification category means for the AFD-based model 502 are [138, 139, 105, 30, 132], the AFD 210 generates the example offsets 416 as [29, 7, 11, 5, 25], for a subsequent classification of the vector to be classified 500. In another example, the AFD 210 may generate the offset based on the difference between the model 300 and the AFD-based model 502, thereby resulting in offsets of [−29, −7, −11, −5, −25].

Once the auto-feature discriminator 210 generates the example offsets 416, the auto-feature discriminator 210 adjust the vector to be classified 500, thereby generating the adjusted vector to be classified 512. For example, auto-feature discriminator 210 generates the adjusted vector to be classified 512 by combining (e.g., summing or subtracting, depending on how the offsets were generated) the vector to be classified 500 with the offsets 416 (e.g., [109, 131, 94, 19, 107]+[−29, −7, −11, −5, −25]=[80, 124, 83, 14, 82]). The auto-feature discriminator 210 transmits the adjusted vector to be classified 512 to the example PME 208 for a subsequent PME-based classification, resulting in the second classification as the example PME-based overall classification 514 based on the subsequent PME-based classification (e.g., by comparing the adjusted vector to the vectors of the global model). Because the subsequent PME-based overall classification 514 matches the AFD-based overall classification 506, the example counter(s) 214 corresponding to a match is incremented and the operation controller 204 performs a corresponding action based on the input instructions.

While an example manner of implementing the example fog/edge-based data classifier system 102 of FIG. 1 is illustrated in FIG. 2, one or more of the elements, processes and/or devices illustrated in FIG. 2 may be combined, divided, re-arranged, omitted, eliminated and/or implemented in any other way. Further, the example sensor interface(s) 202, the example input interface 200, the example operation controller 204, the example vector generator 206, the example pattern matching engine 208, the example auto-feature discriminator 210, the example comparator 212, the example counter(s) 214, and/or the example transmitter 216, and/or, more generally, the example fog/edge-based data classifier system 102 of FIG. 2 may be implemented by hardware, software, firmware and/or any combination of hardware, software and/or firmware. Thus, for example, any of the example sensor interface(s) 202, the example input interface 200, the example operation controller 204, the example vector generator 206, the example pattern matching engine 208, the example auto-feature discriminator 210, the example comparator 212, the example counter(s) 214, and/or the example transmitter 216, and/or, more generally, the example fog/edge-based data classifier system 102 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example sensor interface(s) 202, the example input interface 200, the example operation controller 204, the example vector generator 206, the example pattern matching engine 208, the example auto-feature discriminator 210, the example comparator 212, the example counter(s) 214, and/or the example transmitter 216, and/or, more generally, the example fog/edge-based data classifier system 102 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example fog/edge-based data classifier system 102 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
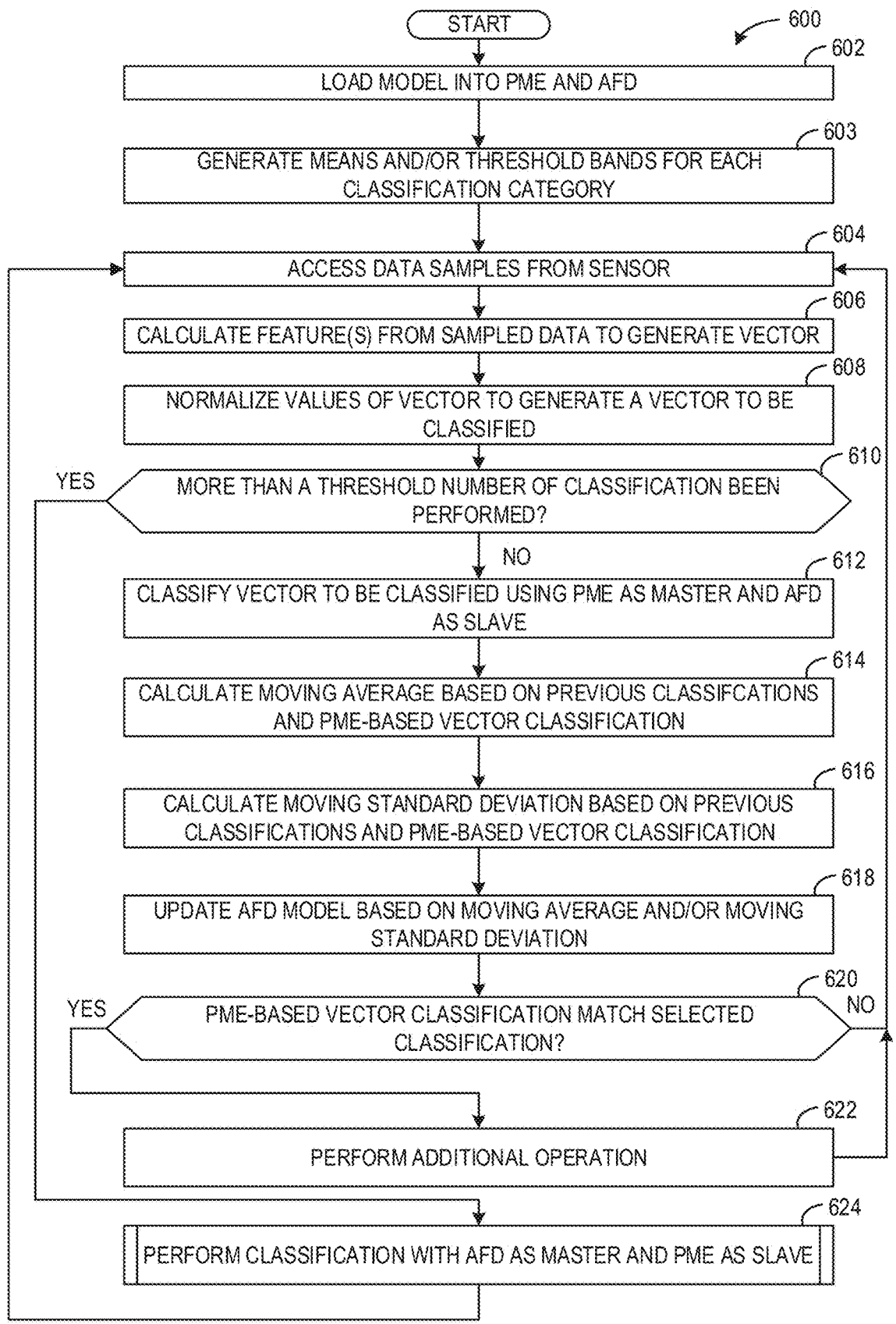
FIGS. 6-8 are flowcharts representative of example machine readable instructions which may be executed to implement the example edge/fog-based data classifier system of FIGS. 1 and/or 2 to perform edge/fog-based classifications.
Figure 7:
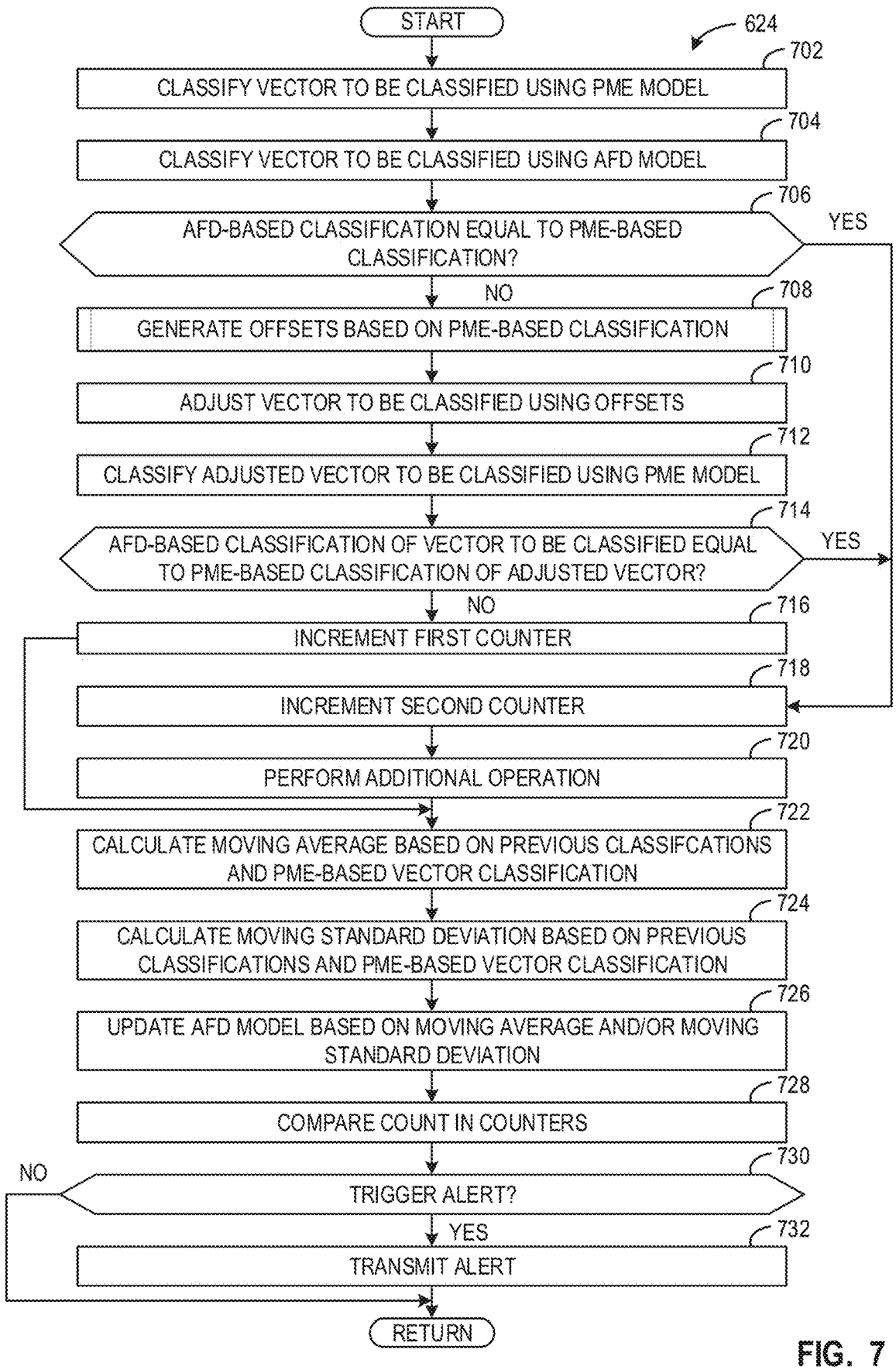
Figure 8:
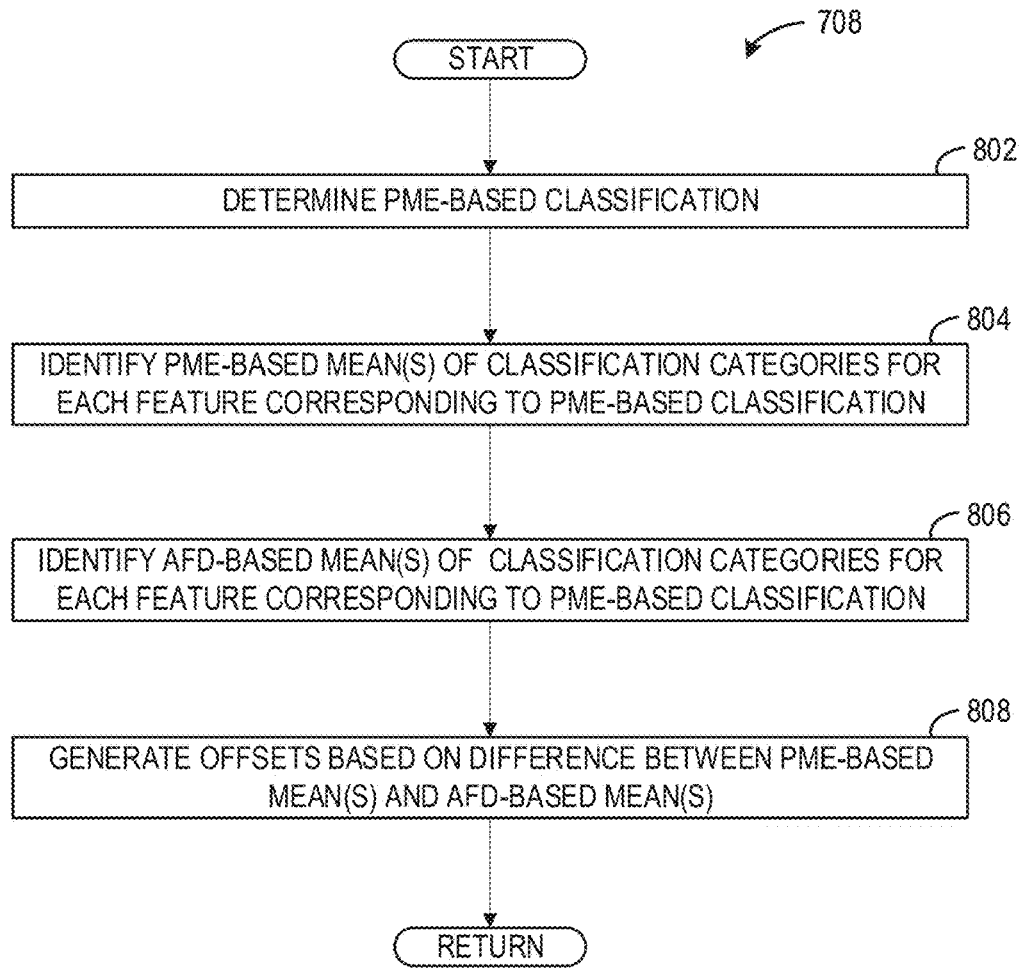

Flowcharts representative of example hardware logic, machine readable instructions, hardware implemented state machines, and/or any combination thereof for implementing the example fog/edge-based data classifier system 102 of FIG. 1 and/or FIG. 2 are shown in FIGS. 6-8. The machine readable instructions may be an executable program or portion of an executable program for execution by a computer processor such as the processor 912 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowcharts illustrated in FIG. 6-8, many other methods of implementing the example fog/edge-based data classifier system 102 of FIG. 2 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example process of FIGS. 6-8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

FIG. 6 is an example flowchart 600 representative of example machine readable instructions that may be executed by the example implementation of the fog/edge-based data classifier system 102 of FIG. 2 to classify data from the example sensor(s) 104 of FIG. 1. Although the flowchart 600 of FIG. 6 is described in conjunction with the example fog/edge-based data classifier system 102 of FIG. 2, other type(s) of dot product calculator(s) and/or other type(s) of processor(s) may be utilized instead.

At block 602, the example operation controller 204 loads a model into the example pattern matching engine 208 and the example auto-feature discriminator 210. The model is a PME-based model received at the example input interface 200. As described above, the model includes classification categories defined by vectors representative of global data developed using data science techniques. At block 603, the AFD-based model 210 generates the means and/or threshold bands for the classification categories based on vectors of the global data model (e.g., corresponding to the example model 300 of FIG. 3A). In some examples, the means and/or threshold bands may be loaded into the AFD 210 (such as in block 602). At block 604, the example vector generator 206 accesses X number of data samples from the example sensor(s) 104 via the example sensor interface(s) 202. As described above in conjunction with FIG. 1, the sensor(s) 104 detects a characteristic of an environment and/or object and a processor (e.g., coupled to the sensor) converts the detection into a data sample (e.g., an electronic signal representative of the measured characteristic). Accordingly, the X number of data samples correspond to X detections by the example sensor 104 that have been converted by a processor into X signals representative of the measurements. In some examples, a local memory and/or buffer may store the X data samples (e.g., corresponding to the most recently generated data samples), as further described above in conjunction with FIG. 2. In such examples, the vector generator 206 may access the X number of data samples from the local memory.

At block 606, the example vector generator 206 calculates feature(s) from the sampled data to generate a vector. The example vector generator 206 determines what features are used in the model and calculate(s) the features based on the data samples. For example, if one of the features in the model is rate of change of acceleration, the vector generator 206 calculates the rate of change of acceleration from the data samples. The vector generator 206 generates the vector based on the calculated features corresponding to the model.

At block 608, the example vector generator 206 normalizes the values of the vector to generate a vector to be classified. For example, if the pattern matching engine 208 is configured to make classification of values within a preset range (e.g., 0-255), the vector generator 206 normalizes the vector so that the values of the vector correspond to the preset range. At block 610, the example auto-feature discriminator 210 determines if more than a threshold number of classifications have been performed. As described above, the auto-feature discriminator 210 initially operates as a slave (e.g., following the PME-based model) during a bedding-in period as the AFD-based model is built. Accordingly, if more than a threshold number of classifications have not been performed (e.g., total classifications or per classification category), the AFD continues to operate as a slave while the AFD-based model is built using the moving average of local data and PME-based classifications. If more than a threshold number of classifications have been performed, the AFD operates as a master and applied the AFD-based model.

If the example auto-feature discriminator 210 determines that more than a threshold number of classification have been performed (block 610: YES), the example fog/edge-based data classifier system 102 performs classification with the AFD 210 as a master and the PME 208 as a slave (block 624), as further described below in conjunction with FIG. 7. If the example auto-feature discriminator 210 determines that more than a threshold number of classification have not been performed (block 610: NO), the example PME 208 classifies the vector to be classified using the PME-based model (e.g., corresponding to the global data) that was loaded into the PME 208 at block 602 (block 612). For example, the PME 208 compares the vector to be classified to vectors of the global model to identify a vector that matches or is closed to the vector to be classified and outputs a corresponding classification.

At block 614, the example the example AFD 210 calculates a moving average based on the previous classifications (e.g., local classifications) and the PME-based vector classification. For example, the example AFD 210 determines the PME-based classification and computes a moving average of the PME-based classification with other prior classified vectors corresponding to the same PME-based classification and the PME-based classification average. In this manner, the AFD 210 can generate an AFD-based model that corresponds to local data (e.g., corresponding the moving average of local data) and/or a moving average of the local data and the global data. At block 616, the example AFD 210 calculates the moving standard deviation based on the previous classifications (e.g., local classifications) and the PME-based vector classification. For example, the example AFD 210 determines the PME-based classification and computes a moving standard deviation of the PME-based classification with other prior classified vectors corresponding to the same PME-based classification and/or the PME-based classification standard deviations. The standard deviations may be used to generate the minimum and/or maximum threshold(s) for the feature classifications in the AFD-based model. At block 618, the example AFD 210 updates the AFD-based model (e.g., the feature classification threshold ranges) based on the moving average and/or moving standard deviation.

At block 620, the example comparator 212 determines if the PME-based vector classification matches a selected classification. A selected classification may be a preset classification that corresponds to specific actions to be performed. For example, If the example fog/edge-based data classifier system 102 is to determine if the example animal 101 is lame, the example fog/edge-based data classifier system 102 must first determine whether or not the animal 101 is walking, to then be able to load a model in the example PME 208 and/or the example AFD 210 corresponding to lameness. Accordingly, in such an example, the comparator 212 may compare the PME-based classification with a selected classification of walking. If the example comparator 212 determines that the PME-based vector classification does not match the selected classification (block 620: NO), the process returns to block 604. If the example comparator 212 determines that the PME-based vector classification matches the selected classification (block 620: YES), the operation controller 204 performs an additional (e.g., preset) operation (block 622). For example, the operation controller 204 may transmit an alert via the transmitter 216, reset and/or increment one or more of the counter(s) 214, load a different model into the example PME 208 and/or AFD 210, etc.

FIG. 7 is an example flowchart 624 representative of example machine readable instructions that may be executed by the example implementation of the fog/edge-based data classifier system 102 of FIG. 2 to perform classification with the AFD 210 as a master and the PME 208 as a slave (e.g., by implementing the example AFD-based model for classification), as further described above in conjunction with block 624 of FIG. 6.

At block 702, the example PME 208 classifies the vector to be classified using the PME-based model (e.g., vectors and corresponding classifications based on the global data). At block 704, the example AFD 210 classifies the vector to be classified using the AFD-based model (e.g., corresponding to the moving average of the local data). As described above in conjunction with FIG. 4, the AFD-based model is based on prior classifications of prior vector to be classified generated based on local data. Accordingly, the AFD-based model corresponds to different means and/or standard deviations associated with the PME-based model, which may or may not result in different overall classifications.

At block 706, the example comparator 212 determines if the AFD-based classification is equal to the PME-based classification. If the example comparator 212 determines that the AFD-based classification is equal to the PME-based classification (block 706: YES), the process continues to block 718, as further described below. If the example comparator 212 determines that the AFD-based classification is not equal to the PME-based classification (block 706: NO), the example AFD 210 generates offsets based on the PME-based classification (block 708), as further described below in conjunction with FIG. 8. In some examples, the example counter(s) 214 may increment a mismatch counter responsive to the comparator 212 determining that the AFD-based classification is not equal to the PME-based classification. In other examples, additional hardware may be used to prevent the counter(s) 214 from incrementing a counter responsive to the comparator 212 determining that the AFD-based classification is not equal to the PME-based classification.

At block 710, the example AFD 210 adjusts the vector to be classified using the offsets. For example, the AFD 210 may add or subtract the offsets to/from the vector to be classified (e.g., depending on how the offsets were generated). The AFD 210 transmits the adjusted vector to be classified to the example PME 208 for a subsequent PME-based classification based on the adjusted vector to be classified. At block 712, the example PME 208 classifies the adjusted vector to be classified using the PME-based model. At block 714, the example comparator 212 determines if the AFD-based classification of the vector to be classified is equal to the PME-based classification of the adjusted vector to be classified (e.g., after the offsets have been applied).

If the example comparator 212 determines that the AFD-based classification of the vector to be classified is not equal to the PME-based classification of the adjusted vector to be classified (block 714: NO), the example counter(s) 214 increments a first counter corresponding to a classification mismatch (block 716). If the example comparator 212 determines that the AFD-based classification of the vector to be classified is equal to the PME-based classification of the adjusted vector to be classified (block 714: YES), the example counter(s) 214 increments a second counter corresponding to a classification match (block 718). At block 720, the operation controller 204 performs an additional (e.g., preset) operation. For example, the operation controller 204 may transmit an alert via the transmitter 216, reset and/or increment one or more of the counter(s) 214, load a different model into the example PME 208 and/or AFD 210, etc.

At block 722, the example the example AFD 210 calculates a moving average based on the previous classifications (e.g., local classifications) and the PME-based vector classification. For example, as further described above in conjunction with FIG. 4, the example AFD 210 determines the PME-based classification and computes a moving average of the PME-based classification with other prior classified vectors corresponding to the same PME-based classification and the PME-based classification average. In this manner, the AFD 210 can generate an AFD-based model that corresponds to global data (e.g., corresponding to the PME-based model) and local data (e.g., corresponding the moving average of local data).

At block 724, the example AFD 210 calculates the moving standard deviation based on the previous classifications (e.g., local classifications) and the PME-based vector classification. For example, the example AFD 210 determines the PME-based classification and computes a moving standard deviation of the PME-based classification with other prior classified vectors corresponding to the same PME-based classification and/or the PME-based classification standard deviations. The standard deviations may be used to generate the minimum and/or maximum threshold(s) for the feature classifications in the AFD-based model. At block 726, the example AFD 210 updates the AFD-based model (e.g., the feature classification thresholds) based on the moving average and/or moving standard deviation.

At block 728, the example operation controller 204 compares the count in the example counter(s) 214. For example, the operation controller 204 may compare the mismatch count to the match count to see if an alert needs to be generated to a user. For example, if the number of either counter goes above a threshold count and/or if the ratio of the mismatch count to the match count reaches a threshold ratio, the operation controller 204 may generate an alert to identify a protentional problem with fog/edge-based data classifier system 102, the sensor(s) 104, and/or the animal 101. At block 730, the example operation controller 204 determines if an alert should be triggered (e.g., based on the count in the counter(s) 214). If the example operation controller 204 determines that an alert should not be triggered (block 730: NO), the process returns to block 604 of FIG. 6. If the example operation controller 204 determines that an alert should be triggered (block 730: YES), the example operation controller 204 generates the alert and transmit the alert to the example remote system 106 of FIG. 1 using the example transmitter 216 (block 732), and the process returns to block 604 of FIG. 6. Additionally or alternatively, the example operation controller 204 may perform an additional or alternative action (e.g., reset the counter(s), adjust the AFD-based model, etc.).

FIG. 8 is an example flowchart 708 representative of example machine readable instructions that may be executed by the example implementation of the fog/edge-based data classifier system 102 of FIG. 2 to generate offsets based on means of classification categories of the PME-based model, as further described above in conjunction with block 708 of FIG. 7.

At block 802, the example AFD 210 determines what the PME-based classification was. At block 804, the example AFD 210 identifies the mean(s) of the classification categor(ies) for the feature associated with the global mode corresponding to the PME-based classification. For example, if the example AFD 210 determines that the PME-based classification was a first classification (e.g., based on communications between the AFD 210 and the PME 208), the example AFD 210 identifies the PME-based means for the five first classification features of the model 300 corresponding to the PME-based model to be [109, 132, 94, 25, 107].

At block 806, the example AFD 210 identifies the AFD-based mean(s) of classification categor(ies) for the features corresponding to the AFD-based classifications. For example, using the example AFD-based model 502 of FIG. 5, if the example AFD 210 determines that the PME-based classification was a first classification, the example AFD 210 identifies the AFD-based means for the five first classification features of the AFD-based model 502 to be [138, 139, 105, 30, 132]. At block 808, the example AFD 210 generates the offsets based on a difference between the AFD-based means(s) and the PME-based mean(s). for example the AFD 210 generates the offsets of [29, 7, 11, 5, 25]. Alternatively, the example AFD 210 may generate the offsets based on a difference between the PME-based mean(s) and AFD-based mean(s), thereby corresponding to offsets of [−29, −7, −11, −5, −25]. After block 808, the process returns to block 710 of FIG. 7.

Figure 9:
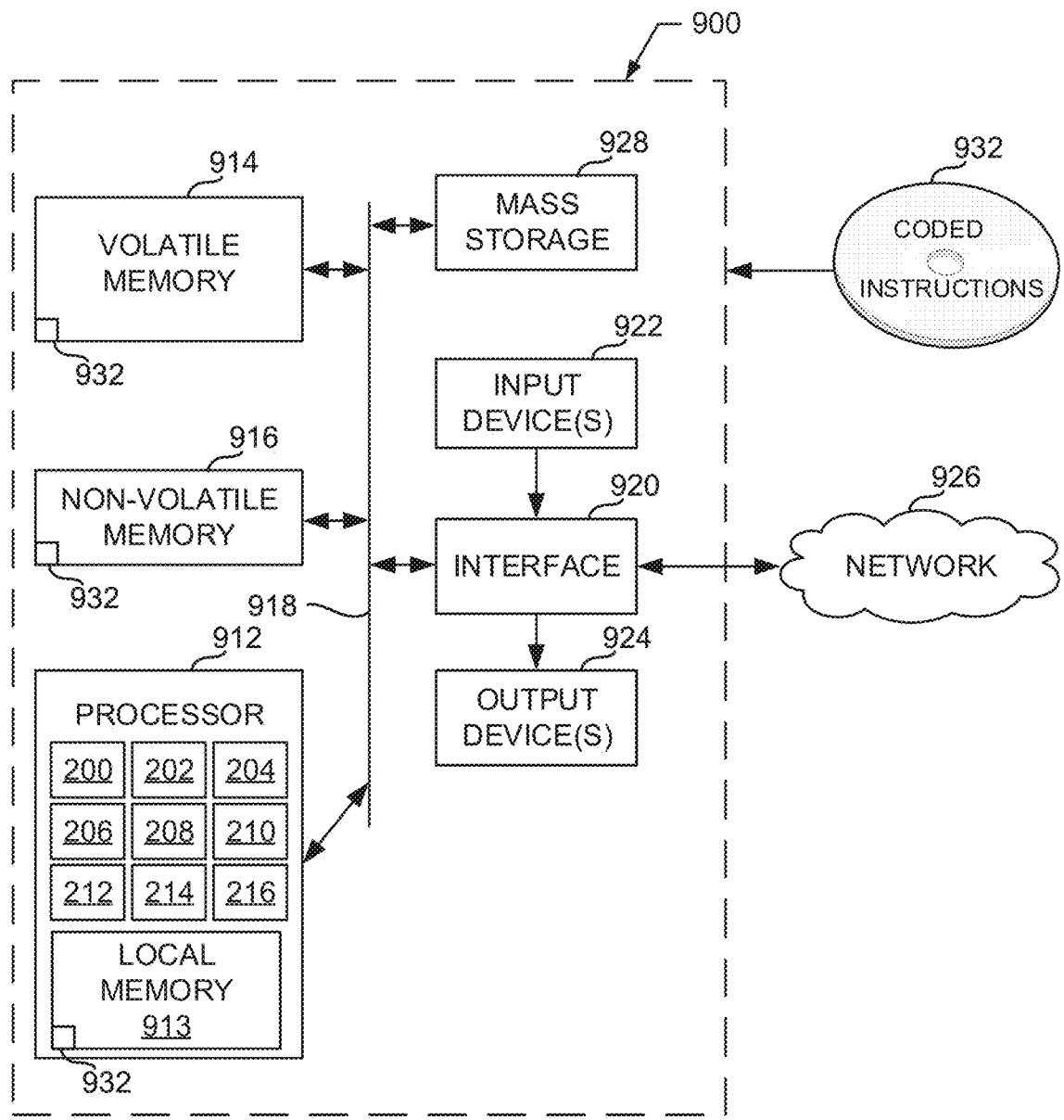
FIG. 9 is a block diagram of an example processing platform structured to execute the instructions of FIGS. 6-8 to implement the example edge/fog-based data classifier system of FIGS. 1 and 2.

FIG. 9 is a block diagram of an example processor platform 900 structured to execute the instructions of FIGS. 6-8 to implement the example fog/edge-based data classifier system 102 of FIG. 2. The processor platform 900 can be, for example, a server, a personal computer, a workstation, a self-learning machine (e.g., a neural network), a mobile device (e.g., a cell phone, a smart phone, a tablet such as an iPad), a microcontroller, a system-on-chip, a fog-edge-based device, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example sensor interface(s) 202, the example input interface 200, the example operation controller 204, the example vector generator 206, the example pattern matching engine 208, the example auto-feature discriminator 210, the example comparator 212, the example counter(s) 214, and/or the example transmitter 216.

The processor 912 of the illustrated example includes a local memory 913 (e.g., a cache). The processor 912 of the illustrated example is in communication with a main memory including a volatile memory 914 and a non-volatile memory 916 via a bus 918. In some examples, the main memory implements the example memory 105. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Wi-Fi interface, a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIGS. 6-8 may be stored in the mass storage device 928, in the volatile memory 914, in the non-volatile memory 916, and/or on a removable non-transitory computer readable storage medium such as a CD or DVD.

Example 1 includes an apparatus comprising a transducer mounted on a tracked object, the transducer to generate first and second data samples corresponding to the tracked object, a discriminator to generate a first classification using a first model based on a first calculated feature of the first data samples from the transducer, the first model corresponding to calculated features determined from second data samples, the second data samples obtained prior to the first data samples, generate an offset based on a difference between a first model feature the first model and a second model feature of a second model, the second model being different than the first model, and adjust the first calculated feature using the offset to generate an adjusted feature, a pattern matching engine to generate a second classification using vectors corresponding to the second model based on the adjusted feature, and a counter to, when the first classification matches the second classification, increment a count.

Example 2 includes the apparatus of example 1, wherein the pattern matching engine is to generate a third classification using the vectors corresponding to the second model based on the first calculated feature, and the discriminator to generate the offset responsive to the third classification mismatching first classification.

Example 3 includes the apparatus of example 1, further including a vector generator to generate a vector from the first data samples, the vector including the first calculated feature.

Example 4 includes the apparatus of example 3, wherein the vector generator is to generate the vector based on features corresponding to the second model.

Example 5 includes the apparatus of example 1, further including a comparator to compare the first classification to the second classification.

Example 6 includes the apparatus of example 1, wherein the counter is a first counter and the count is a first count, further including a second counter to, when the first classification mismatches the second classification, increment a second count.

Example 7 includes the apparatus of example 1, further including a transmitter to transmit an alert to a remote device based on at least one of the count, the first classification, or the second classification.

Example 8 includes the apparatus of example 1, wherein the first model corresponds to an average of the calculated features determined from the second data samples.

Example 9 includes the apparatus of example 8, wherein the average includes classification category averages of the second model.

Example 10 includes a non-transitory computer readable storage medium comprising executable computer program instruction which, when executed, cause a machine to at least generate a first classification using a first model based on a first calculated feature of first data samples from a transducer, the first model corresponding to calculated features determined from second data samples, the second data samples obtained from the transducer prior to the first data samples, generate an offset based on a difference between a first model feature the first model and a second model feature of a second model, the second model being different than the first model, adjust the first calculated feature using the offset to generate an adjusted feature, generate a second classification using vectors corresponding to the second model based on the adjusted feature, and responsive to the first classification matching the second classification, increment a count.

Example 11 includes the computer readable storage medium of example 10, wherein the instructions cause the machine to generate a third classification using the vectors corresponding to the second model based on the first calculated feature, and generate the offset responsive to the third classification mismatching first classification.

Example 12 includes the computer readable storage medium of example 10, wherein the instructions cause the machine to generate a vector from the first data samples, the vector including the first calculated feature.

Example 13 includes the computer readable storage medium of example 12, wherein the instructions cause the machine to generate the vector based on features corresponding to the second model.

Example 14 includes the computer readable storage medium of example 10, wherein the instructions cause the machine to compare the first classification to the second classification.

Example 15 includes the computer readable storage medium of example 10, wherein the count is a first count, wherein the instructions cause the machine to, when the first classification mismatches the second classification, increment a second count.

Example 16 includes the computer readable storage medium of example 10, wherein the instructions cause the machine to transmit an alert to a remote device based on at least one of the count, the first classification, or the second classification.

Example 17 includes the computer readable storage medium of example 10, wherein the first model corresponds to an average of the calculated features determined from the second data samples.

Example 18 includes the computer readable storage medium of example 17, wherein the average includes classification category averages of the second model.

Example 19 includes a method comprising generating, using a transducer mounted to an object, data samples corresponding to a tracked object, generating, by executing an instruction with a processor, a first classification using a first model based on a first calculated feature of first data samples from a transducer, the first model corresponding to calculated features determined from second data samples, the second data samples obtained from the transducer prior to the first data samples, generating, by executing an instruction with the processor, an offset based on a difference between a first model feature the first model and a second model feature of a second model, the second model being different than the first model, adjusting, by executing an instruction with the processor, the first calculated feature using the offset to generate an adjusted feature, generating a second classification using vectors corresponding to the second model based on the adjusted feature, and responsive to the first classification matching the second classification, incrementing a count.

Example 20 includes the method of example 19, further including generating a third classification using the vectors corresponding to the second model based on the first calculated feature, and generating the offset responsive to the third classification mismatching first classification.

From the foregoing, it will be appreciated that example methods, apparatus and articles of manufacture have been disclosed that improve accuracy of a fog/edge-based classifier system. The disclosed methods, apparatus and articles of manufacture improve the accuracy of data classifier systems by combining a PME-based classification corresponding to a global model with an AFD-based classification corresponding to a local model. In this manner, examples disclosed herein provide an energy efficient fog/edge-based classifier system that is more accurate than conventional fog/edge-based data classifier systems. Accordingly, examples disclosed herein improve the accuracy of a computing device with limited/constrained processor. Disclosed methods, apparatus and articles of manufacture are accordingly directed to one or more improvement(s) in the functioning of an edge/fog based processor.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a transducer to be carried by a tracked object, the transducer to generate first and second data samples corresponding to the tracked object;
discriminator instructions to cause at least one processor circuit to:
generate a first classification using a first model, the first model based on a calculated feature of the first data samples from the transducer, the first model corresponding to calculated features determined from the second data samples, the second data samples obtained prior to the first data samples;
generate an offset based on a difference between a first output of the first model and a second output of a second model, the second model different than the first model; and
adjust the calculated feature using the offset to generate an adjusted feature;
pattern matching engine instructions to cause the at least one processor circuit to generate a second classification using a vector corresponding to the second model based on the adjusted feature; and
a counter to, when the first classification matches the second classification, increment a count.

2. The apparatus of claim 1, wherein:
the pattern matching engine instructions are to cause the at least one processor circuit to generate a third classification using the vector corresponding to the second model based on the calculated feature; and
the discriminator instructions are to cause the at least one processor circuit to generate the offset responsive to the third classification mismatching the first classification.

3. The apparatus of claim 1, further including vector generator instructions to cause the at least one processor circuit to generate the vector from the first data samples, the vector including the calculated feature.

4. The apparatus of claim 3, wherein the vector generator instructions are to cause the at least one processor circuit to generate the vector based on features corresponding to the second model.

5. The apparatus of claim 1, further including a comparator to compare the first classification to the second classification.

6. The apparatus of claim 1, wherein the counter is a first counter and the count is a first count, further including a second counter to, when the first classification mismatches the second classification, increment a second count.

7. The apparatus of claim 1, further including a transmitter to transmit an alert to a remote device when the count satisfies a threshold.

8. The apparatus of claim 1, wherein the first model corresponds to an average of the calculated features determined from the second data samples.

9. The apparatus of claim 8, wherein the average includes classification category averages of the second model.

10. The apparatus of claim 1, wherein the count is a first count, further including operation controller circuitry to:
determine a ratio of the first count and a second count, the second count corresponding to mismatches of classifications corresponding to the first model and the second model; and
alert a user when the ratio is satisfies a threshold.

11. The apparatus of claim 1, wherein the first model is pattern matching-based classification model and the second model is an automated feature-based classification model.

12. The apparatus of claim 1, wherein the first model performs distance-based classifications and the second model performs local-data based classifications.

13. A non-transitory computer readable storage medium comprising executable computer program instruction which, when executed, cause a machine to at least:
execute a first model to generate a first classification, the first classification based on a calculated feature of first data samples from a transducer, the first model corresponding to calculated features determined from second data samples, the second data samples obtained from the transducer prior to the first data samples;
generate an offset based on a difference between a first output of the first model and a second output of a second model, the second model different than the first model;
adjust the calculated feature using the offset to generate an adjusted feature;
generate a second classification using a vector corresponding to the second model based on the adjusted feature; and
increment a count indicative of a match between the first and second classifications.

14. The computer readable storage medium of claim 13, wherein the instructions cause the machine to:
generate a third classification using the vector corresponding to the second model based on the calculated feature; and
generate the offset responsive to the third classification mismatching the first classification.

15. The computer readable storage medium of claim 13, wherein the instructions cause the machine to generate the vector from the first data samples, the vector including the calculated feature.

16. The computer readable storage medium of claim 15, wherein the instructions cause the machine to generate the vector based on features corresponding to the second model.

17. The computer readable storage medium of claim 13, wherein the instructions cause the machine to compare the first classification to the second classification.

18. The computer readable storage medium of claim 13, wherein the count is a first count, wherein the instructions cause the machine to, when the first classification mismatches the second classification, increment a second count.

19. The computer readable storage medium of claim 13, wherein the instructions cause the machine to transmit an alert to a remote device based on at least one of the count, the first classification, or the second classification.

20. The computer readable storage medium of claim 13, wherein the first model corresponds to an average of the calculated features determined from the second data samples.

21. The computer readable storage medium of claim 20, wherein the average includes classification category averages of the second model.

22. A method comprising:
generating, using a sensor, data samples corresponding to a tracked object;
generating, by executing an instruction with a processor, a first classification using a first model, the first classification based on a calculated feature of first data samples from the sensor, the first model corresponding to calculated features determined from second data samples, the second data samples obtained from the sensor prior to the first data samples;
generating, by executing an instruction with the processor, an offset based on a difference between a first output of the first model and a second output of a second model, the second model different than the first model;

adjusting, by executing an instruction with the processor, the calculated feature using the offset to generate an adjusted feature;

generating a second classification using a vector corresponding to the second model based on the adjusted feature; and incrementing a count indicative of a match between the first and second classifications.

23. The method of claim 22, further including:

generating a third classification using the vector corresponding to the second model based on the calculated feature; and generating the offset responsive to the third classification mismatching the first classification.

24. An apparatus comprising:

memory;

instructions; and processor circuitry to be programmed by the instructions to:

generate a first classification using a first model, the first classification based on a calculated feature of first data samples from a transducer, the first model corresponding to calculated features determined from second data samples, the second data samples obtained from the transducer prior to the first data samples;

generate an offset based on a difference between a first model feature output by the first model and a second model feature output by a second model, the second model different than the first model;

adjust the calculated feature using the offset to generate an adjusted feature;

generate a second classification using a vector corresponding to the second model based on the adjusted feature; and increment a count indicative of a match between the first and second classifications.

25. The apparatus of claim 24, wherein the processor circuitry is to:

generate a third classification using the vector corresponding to the second model based on the calculated feature; and generate the offset responsive to the third classification mismatching the first classification.

26. The apparatus of claim 24, wherein the processor circuitry is to generate the vector from the first data samples based on features corresponding to the second model, the vector including the calculated feature.

27. The apparatus of claim 24, wherein the processor circuitry is to compare the first classification to the second classification.

28. The apparatus of claim 24, wherein the count is a first count, the processor circuitry to record a mismatch between the first classification and the second classification by incrementing a second count.

29. The apparatus of claim 24, wherein the processor circuitry is to transmit an alert to a remote device based on at least one of the count, the first classification, or the second classification.

30. The apparatus of claim 24, wherein the first model corresponds to an average of the calculated features determined from the second data samples, the average including classification category averages of the second model.

* * * * *